United States Patent
Maryamchik et al.

(10) Patent No.: US 6,863,703 B2
(45) Date of Patent: Mar. 8, 2005

(54) COMPACT FOOTPRINT CFB WITH MECHANICAL DUST COLLECTOR

(75) Inventors: Mikhail Maryamchik, Copley Township, Summit County, OH (US); Felix Belin, Brecksville, OH (US); David J. Walker, Wadsworth, OH (US); Donald L. Wietzke, Carlsbad, CA (US)

(73) Assignee: The Babcock & Wilcox Company, New Orleans, LA (US)

( * ) Notice: Subject to any disclaimer, the term of this patent is extended or adjusted under 35 U.S.C. 154(b) by 196 days.

(21) Appl. No.: 10/135,432

(22) Filed: Apr. 30, 2002

(65) Prior Publication Data

US 2003/0202913 A1 Oct. 30, 2003

(51) Int. Cl.⁷ .......................... B01D 45/12; F27B 15/08
(52) U.S. Cl. .......................... 55/342.1; 55/347; 55/348; 55/349; 55/396; 55/434.2; 55/428; 55/444; 55/457; 55/459.1; 422/147
(58) Field of Search ................................ 55/342.1, 347, 55/348, 349, 396, 434.2, 428, 430, 444, 457, 459.1; 422/147; 122/4 D; 110/245

(56) References Cited

U.S. PATENT DOCUMENTS

| | | | | |
|---|---|---|---|---|
| 4,279,624 A | * | 7/1981 | Wilson | .......................... 95/269 |
| 5,064,621 A | * | 11/1991 | Uyama et al. | .............. 422/144 |
| 5,343,830 A | * | 9/1994 | Alexander et al. | .......... 122/4 D |
| 6,269,778 B1 | * | 8/2001 | Anderson et al. | ........... 122/4 D |
| 6,673,133 B2 | * | 1/2004 | Sechrist et al. | ............... 55/348 |

OTHER PUBLICATIONS

STEAM/Its Generation and Use, 40th Ed., Stultz & Kitto, Eds., Copyright © 1992, The Babcock & Wilcox Company, Chapter 16, pp. 16–1 to 16–19.

Babcock & Wilcox Technical Paper BR–1562, 10pp; Figs. 2, 3 and 4 and related text. "CFB Combustor with Internal Solids Recirculation—Pilot Testing and Design Applications", Belin, F. et al.. Presented to the 13th International Conference on Fluidized Bed Combustion, Orlando, Florida, May 7–10, 1995.

(List continued on next page.)

*Primary Examiner*—Robert A. Hopkins
(74) *Attorney, Agent, or Firm*—Kathryn W. Grant; Eric Marich

(57) ABSTRACT

A circulating fluidized bed (CFB) unit utilizing a mechanical dust collector located in a vertical flue above at least one heat exchange surface, and at least partially underneath the floor of a non-vertical flue, includes a plurality of individual collection elements each having a downward bottom outlet for a flow of cleaned gas conveyed through the collection elements.

19 Claims, 10 Drawing Sheets

OTHER PUBLICATIONS

Xuguang Jiang et al., "Design and Operation of a Coal–Washery Sludge Fired 75 t/h Steam Fluidized Bed Combustion Boiler", Proceedings of the 15$^{th}$ International Conference on Fluidized Bed Combustion, Savannah, Georgia, May 16–19, 1999. Copyright 1999, The American Society of Mechanical Engineers. Paper No. FBC99–0049. Figs. 1, 2 and related text, 6pp.

Ming–Shun Tang et al., "Operating Experience of the 75 t/h Two Stage Circulating Fluidized Bed Boiler", Proceedings of the 15$^{th}$ International Conference on Fluidized Bed Combustion, Savannah, Georgia, May 16–18, 1999. Copyright 1999. The American Society of Mechanical Engineers. Paper No. FBC99–0065. Figs. 1, 2 and related text, 3 pp.

Li Xiaodong et al. "The Compact Fluidized Bed Boiler With a Finned Tube Impact Separator and a Uniflow Square Cyclone", Proceedings of the 15$^{th}$ International Conference on Fluidized Bed Combustion, Savannah, Georgia, May 16–19, 1999. Paper No. FBC99–0027. Figs. 1, 3 and related text, 10 pp.

Barron Industries brochure—Dust Collectors—entire brochure 7pp. Date Unknown.

Chinese text, Theory, Design and Operation of Circulating Fluidized Bed Boilers / Qin Kefa, et al., Comp. Beijing: Zhongguo Dianli Chupanshe [China Electric Power Publishers], 1997—4pp. Figs. 9–34 and related text—English translation.

* cited by examiner

COMPACT FOOTPRINT CFB WITH MECHANICAL DUST COLLECTOR

FIELD AND BACKGROUND OF THE INVENTION

FIELD OF THE INVENTION

The present invention relates, in general, to a novel mechanical dust collector design and, more particularly, to its application in circulating fluidized bed (CFB) boilers, reactors or combustors. Such applications would allow reducing a CFB boiler footprint. The mechanical dust collector according to the present invention is provided with a downward bottom outlet for the flow of cleaned gas, and would typically be located in a vertical flue above at least one heat exchange surface and at least partially underneath the floor of a non-vertical flue.

BACKGROUND OF THE INVENTION

The construction and basic principles of operation of circulating fluidized bed (CFB) boilers, reactors or combustors are well known to those skilled in the art and will not be explained herein in detail. For such general details, the reader is thus referred to Steam/its generation and use, $40^{th}$ Edition, Stultz & Kitto, Eds., Copyright © 1992, The Babcock & Wilcox Company, particularly Chapter 16, pages 16-1 through 16-9, the text of which is hereby incorporated by reference as though fully set forth herein.

In the following drawings, like numerals designate the same or functionally similar elements throughout the several drawings. FIG. 1 illustrates a known arrangement of a known CFB boiler comprising a furnace 1, a primary solids separator 2, a non-vertical flue 3 with its floor 4, a vertical flue 5 containing an economizer 6, an air heater 7 located outside of the vertical flue 5 and supported with a separate set of columns 8. A multicyclone mechanical dust collector 10 with a collection hopper 110 is located at the bottom of the vertical flue 5. The flue gas changes its flow direction as it passes through the conventional collection elements of the multicyclone 10, and exits from the multicyclone 10 at the side, as shown, thus imposing the location of the downstream air heater 7 outside of the vertical flue 5 and supporting it with a separate set of columns 8 which results in a larger CFB boiler plan area.

Referring to FIG. 2, there is shown an arrangement of a known CFB boiler utilizing cyclones 11 featuring a side inlet and a downflow clean gas outlet. In this case, the plan area occupied by the cyclones adds to that of the upstream boiler parts (furnace 1 and non-vertical flue 3) thus increasing total CFB boiler plan area. Those cyclones 11 have a lower collection efficiency and larger overall height than the multicyclone 10 described above (comprised of smaller size collection elements) with the same gas pressure differential across the separator.

FIG. 3 illustrates another known CFB boiler arrangement utilizing a low efficiency louver separator 12 located in the downward flow convection pass between economizer 6 and tubular air heater 7. The louver separator 12 is coupled with a cyclone separator 13. Gas with entrained solids flows consecutively through the lower separator 12 and cyclone separator 13 exiting to the side through the wall of the vertical flue 5. Cleaned gas is later reintroduced to the vertical flue 5 through the same wall. Such an arrangement requires substantial space between the CFB furnace 1 and the vertical flue 5, resulting in a larger plan area for the CFB boiler.

SUMMARY OF THE INVENTION

A fundamental purpose of the present invention is to provide an arrangement which reduces the space (primarily, the plan area) occupied by a CFB boiler, reactor or combustor which employs a mechanical dust collector. This is achieved by providing the mechanical dust collector with a downward bottom outlet for the flow of cleaned gas and locating it where the flow of flue gas and entrained particles through the CFB system is predominantly downward. It would be preferably "tucked", at least partially, underneath of the upstream (in gas flow direction) part of the unit featuring a non-vertical flue.

Accordingly, one aspect of the present invention is drawn to a mechanical dust collector apparatus for separating solids particles from a flow of flue gas containing solids particles entrained therein. The apparatus comprises a plurality of individual collection elements each having a downward bottom outlet opening for discharging the flow of cleaned gas.

The various features of novelty which characterize the invention are pointed out with particularity in the claims annexed to and forming a part of this disclosure. For a better understanding of the present invention, its operating advantages and specific benefits attained through its uses, reference is made to the accompanying drawings and descriptive matter wherein a preferred embodiment of the invention is illustrated.

DESCRIPTION OF THE PREFERRED EMBODIMENTS

As used herein, the term CFB boiler will be used to refer to CFB reactors or combustors wherein a combustion process takes place. While the present invention is directed particularly to boilers or steam generators which employ CFB combustors as the means by which the heat is produced, it is understood that the present invention can readily be employed in a different kind of CFB reactor. For example, the invention could be applied in a reactor that is employed for chemical reactions other than a combustion process, or where a gas/solids mixture from a combustion process occurring elsewhere is provided to the reactor for further processing, or where the reactor merely provides an enclosure wherein particles or solids are entrained in a gas that is not necessarily a byproduct of a combustion process.

Thus, although the primary application of the present invention involves utilizing it as a solids or particles separator for CFB boilers, reactors or combustors, the present invention can also be used in other industrial or utility settings. For example, by way of illustration and not limitation, the present invention can be applied to remove dust particles from process flue gas produced by industrial stoker-fired boilers burning a variety of fuels.

Figure 4:
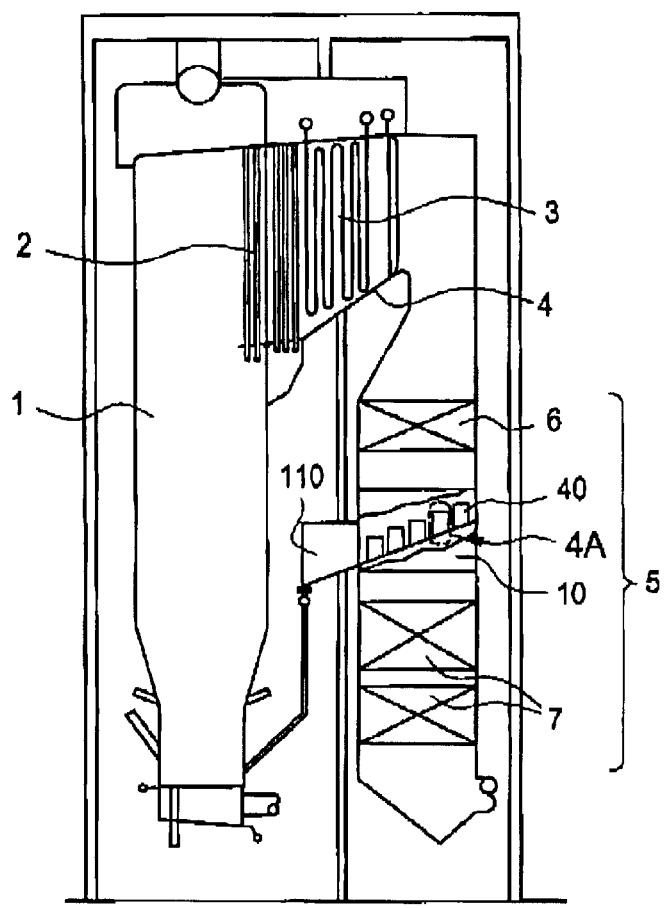
FIG. 4 is a sectional side view of a CFB boiler provided with the mechanical dust collector according to the present invention.
Figure 4A:
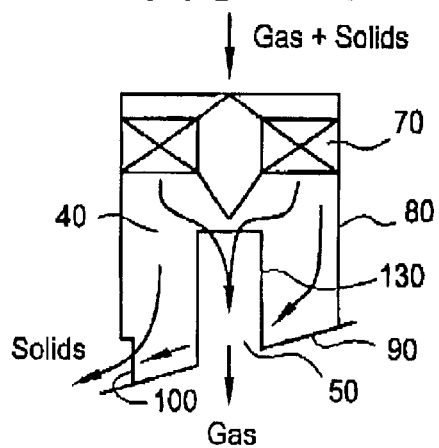
FIG. 4A is an enlarged sectional view of area 4A of FIG. 4, illustrating one collection element according to the present invention as applied to a CFB boiler.

Referring to the drawings generally, wherein again like numerals designate the same or functionally similar elements throughout the several drawings, and to FIGS. 4 and 4A in particular, there is illustrated a first embodiment of the multicyclone mechanical dust collector of the present invention, hereinafter mechanical dust collector 10, which provides for particle separation from flue gases while minimizing the boiler plan area. The mechanical dust collector 10 is located in a vertical flue 5 in between an economizer 6 and an air heater 7. The mechanical dust collector 10 comprises a plurality of individual collection elements 40 arranged in a compact array which permits a downward gas/solids inlet, a downward slanted solids outlet, and a downward gas outlet, as shown. This facilitates placement of the air heater 7 directly beneath the mechanical dust collector 10, thereby reducing the CFB boiler plan area. In fact, the convection pass, the economizer 6 contained therein, the mechanical dust collector 10, and the air heater 7 can all be arranged substantially within the same plan area, resulting in an efficient use of plan area real estate. Moreover, the entire vertical flue 5 is preferably "tucked", at least partially, under the floor 4 of the non-vertical flue 3.

The mechanical dust collector is comprised of a plurality of individual collection elements 40 which can have a variety of configurations and which will now be described. As illustrated in FIG. 4A, flue gas with entrained solids particles enters a top inlet opening of each individual collection element 40 and is swirled by a plurality of angled swirl vanes 70 arranged within an upper portion of a shell 80. Solids in the flue gas are thrown to the outer periphery of the collection element 40 by centrifugal force and slide down assisted by gravity along an inside surface of the shell 80 defining the collection element 40. Upon reaching the bottom of the collection element 40, the solids particles slide along a sloped floor 90 towards at least one side exit opening 100. Solids exiting all of the collection elements 40 continue to slide along the sloped floor 90 to a separator hopper 110 from where they are recycled to the CFB furnace 1. Clean flue gas (that is, flue gas from which the solids particles have been removed) leaves each individual collection element 40 through a centrally located, coaxial exit pipe 130 located within each collection element 40.

Figure 1:
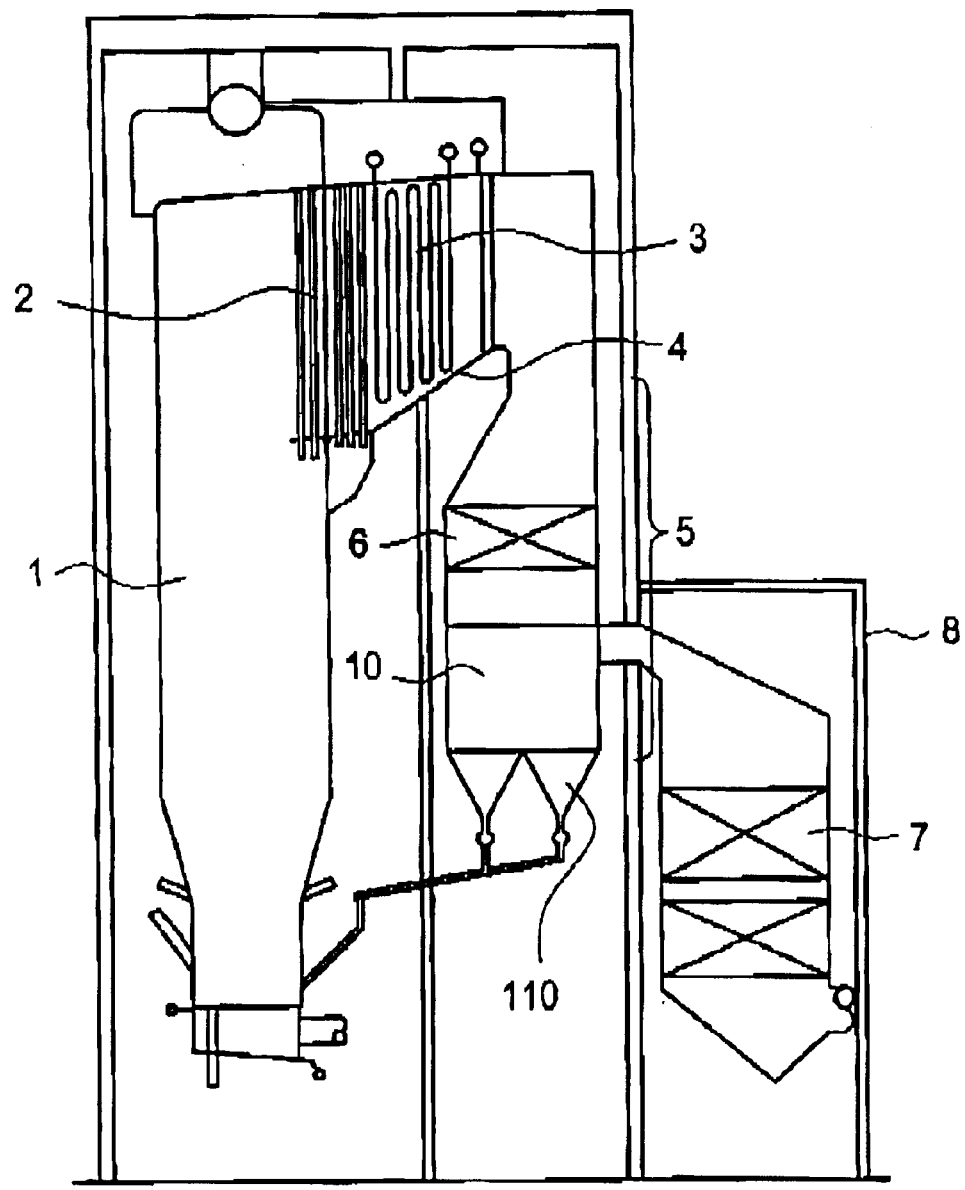
FIG. 1 is a sectional side view of a known CFB boiler.
Figure 2:
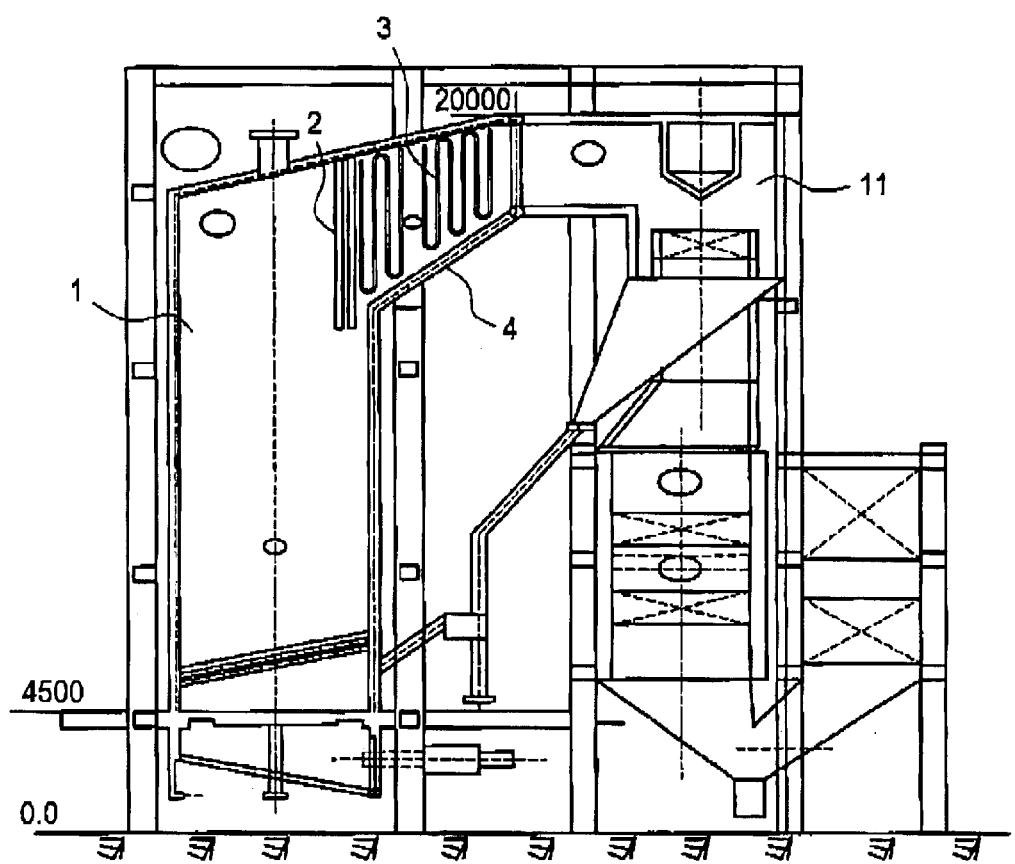
FIG. 2 is a sectional side view of another known CFB boiler.
Figure 3:
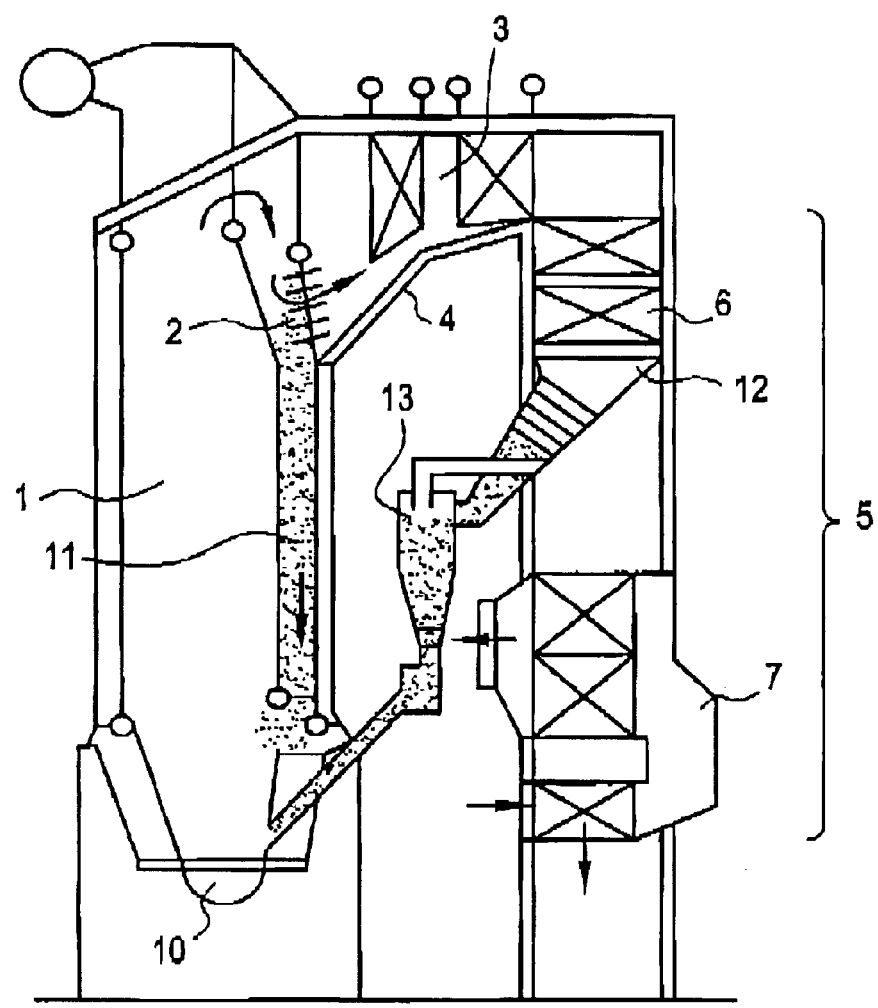
FIG. 3 is a sectional side view of yet another known CFB boiler.

Since the collection efficiency of a centrifugal-type solids separator increases with the reduction of its diameter, the multicyclone mechanical dust collector 10 comprising small collection elements according to the present invention will have a higher collection efficiency at a given pressure differential across the separator 10 as compared to the larger cyclones of the prior art, such as were illustrated in FIG. 2.

The number and arrangement of the individual collection elements 40 used to construct the mechanical dust collector 10 of the present invention can be tailored as required by the operating conditions of a given CFB unit. This feature provides greater application flexibility for either initial unit design or retrofit applications as compared to the case with larger cyclones.

Figure 5:
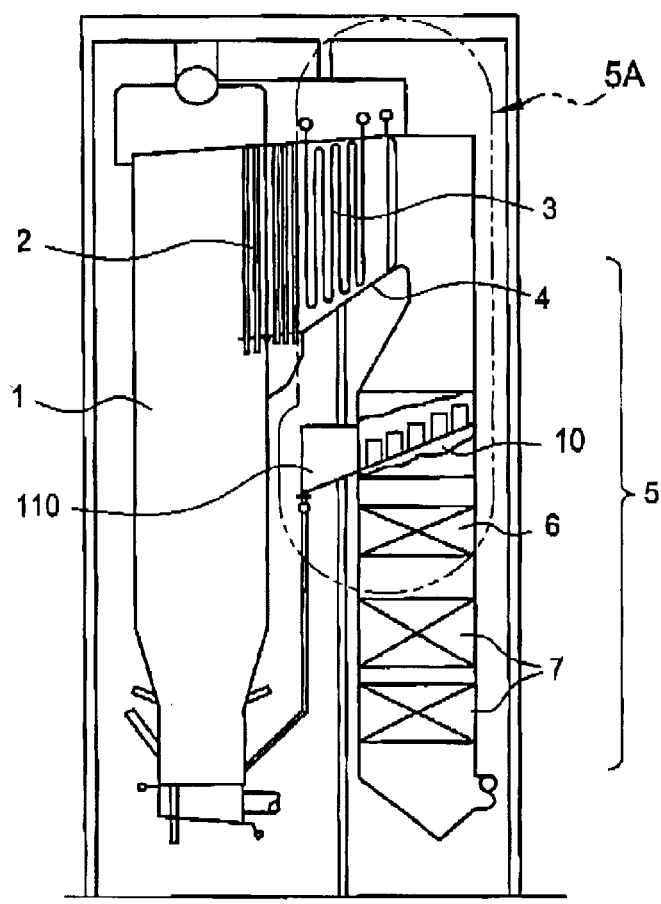
FIG. 5 is a sectional side view of a CFB boiler provided with another embodiment of the mechanical dust collector according to the present invention.

Another embodiment is illustrated in FIG. 5, wherein the mechanical dust collector 10 is located at a top of the vertical flue 5. This arrangement provides reduced solids loading in the flue gas flow through the downstream heating surface comprising economizer 6 and air heater 7, thereby reducing erosion and the required heat duty for these surfaces.

Figure 5A:
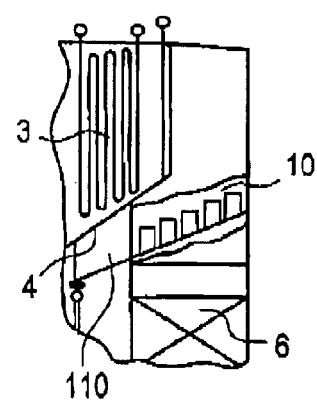
FIG. 5A is a sectional view of an alternate arrangement of one part of the CFB boiler illustrated in FIG. 5.

An alternate arrangement of the upper part of the downflow convection pass of the same general CFB boiler embodiment is shown in FIG. 5A. Here, the floor 4 of the non-vertical flue 3 forms a portion of the enclosure of the vertical flue 5 and (optionally) may also form the roof enclosure of the hopper 110. This arrangement allows for reduction of the height and overall enclosure surface requirement of the vertical flue 5 and (optionally) the hopper 110.

Figure 6:
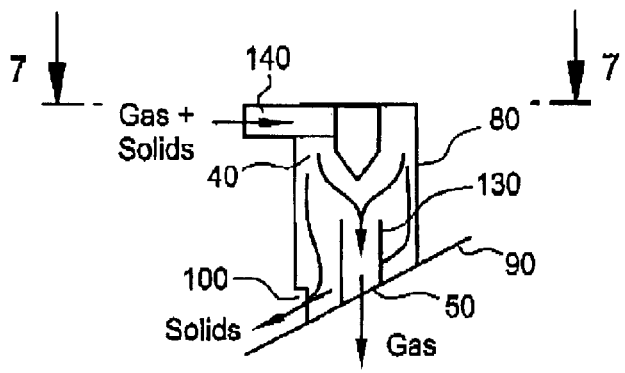
FIG. 6 is a close-up sectional side view of another embodiment of one collection element according to the present invention.
Figure 7:
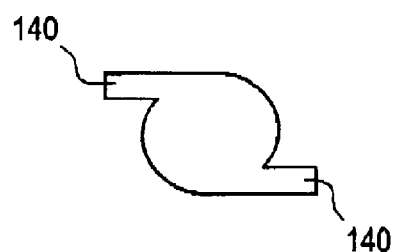
FIG. 7 is a plan view of the collection element of FIG. 6, viewed in the direction of arrows 7—7.
Figure 8:
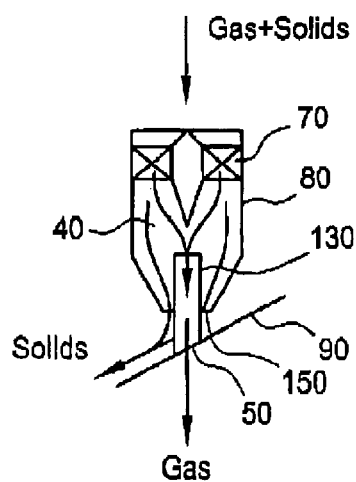
FIG. 8 is a sectional side view of another embodiment of one collection element according to the present invention.

Other variations in the design of the individual collection elements 40 may be employed. As illustrated in FIGS. 6 and 7, while still featuring a downflow clean flue gas exit, the collection elements 40 may (instead of having a top gas inlet and swirl vanes 70), be provided with single or plural tangential side gas inlet(s) 140 to provide a similar swirling effect. Another design variation includes a downflow solids outlet 150, as shown in FIG. 8, wherein the collected solids particles can exit from around the entire periphery of the collection element 40 (outside of the coaxial exit pipe 130) instead of just at the at least one side outlet 100 as shown and described above.

Figure 9:
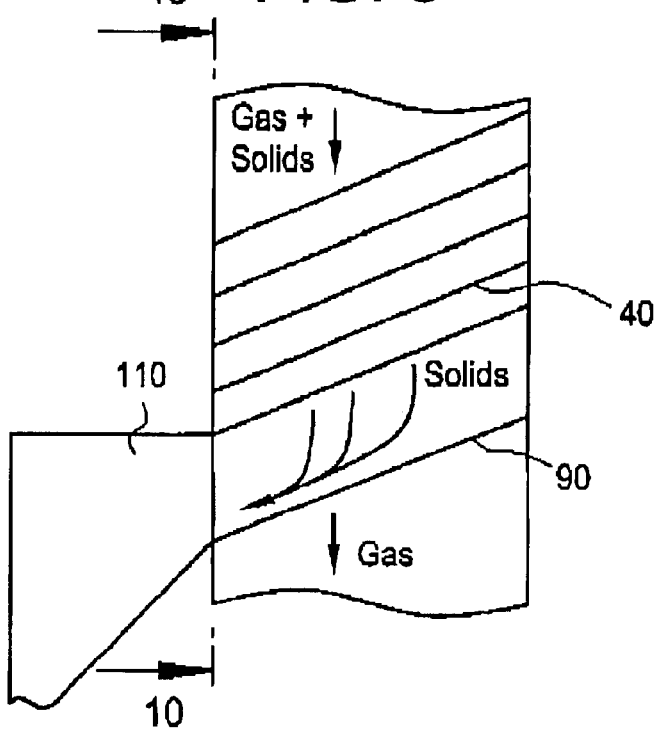
FIG. 9 is a sectional side view of another embodiment of the mechanical dust collector according to the present invention.
Figure 10:
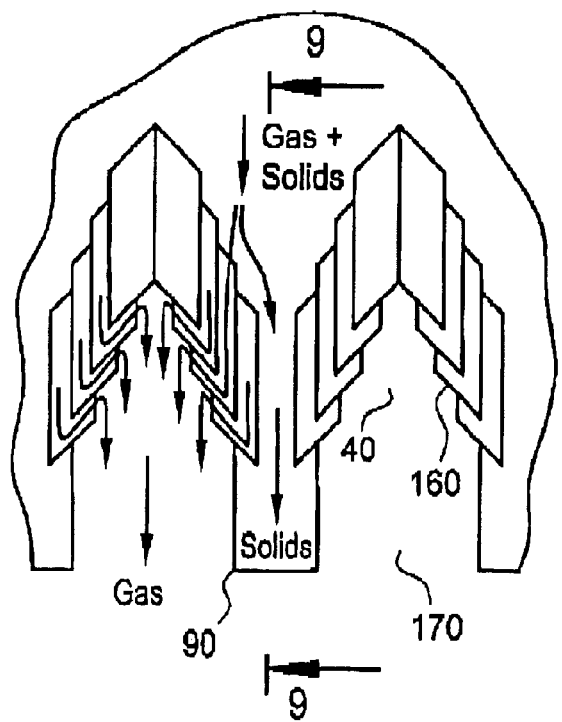
FIG. 10 is a front elevational view of the mechanical dust collector of FIG. 9, viewed in the direction of arrows 10—10.
Figure 11:
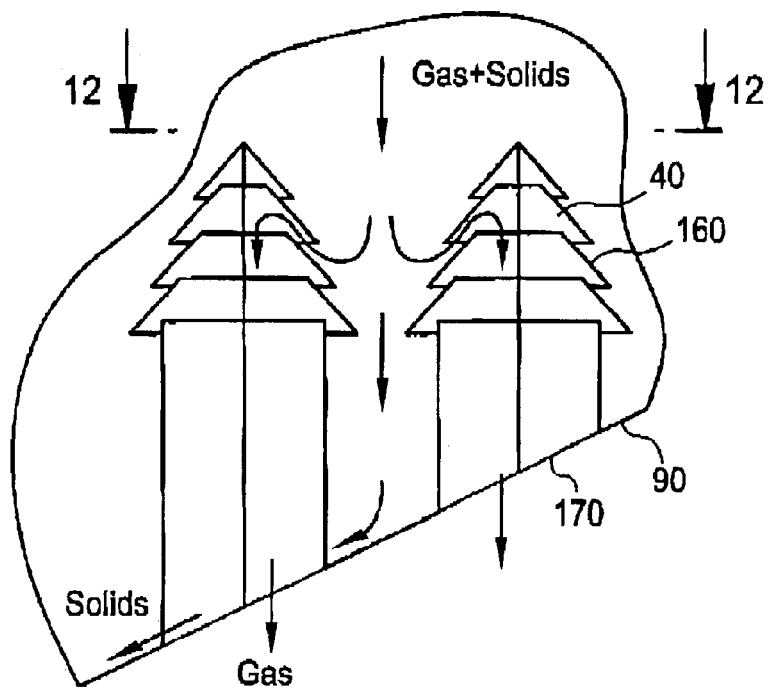
FIG. 11 is a sectional side view of yet another embodiment of the mechanical dust collector according to the present invention.
Figure 12:
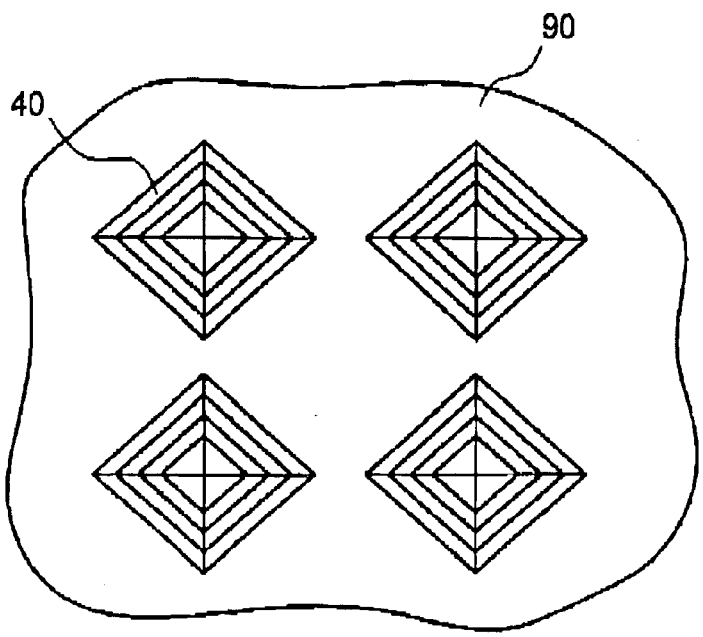
FIG. 12 is a plan view of the collection elements of FIG. 11, viewed in the direction of arrows 12—12.
Figure 13:
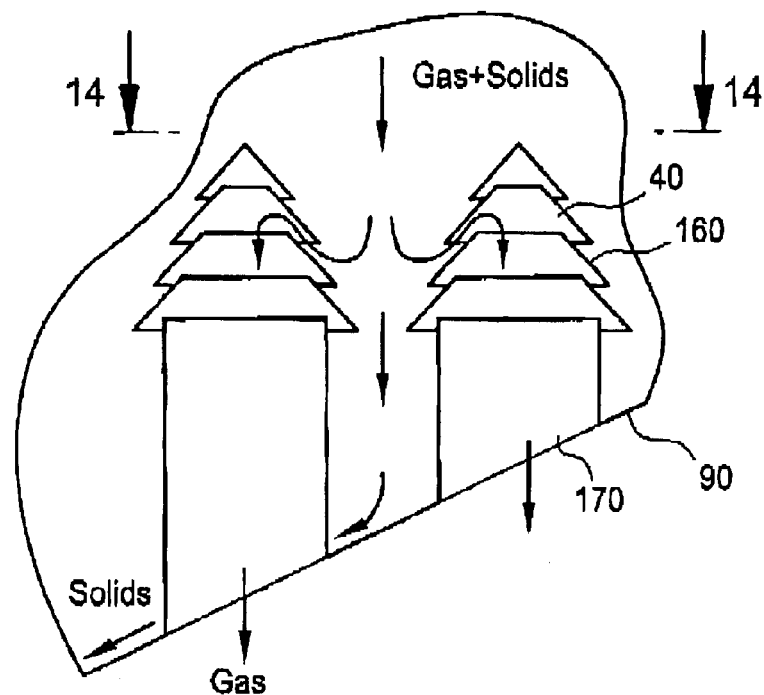
FIG. 13 is a sectional side view of yet another embodiment of the mechanical dust collector according to the present invention.
Figure 14:
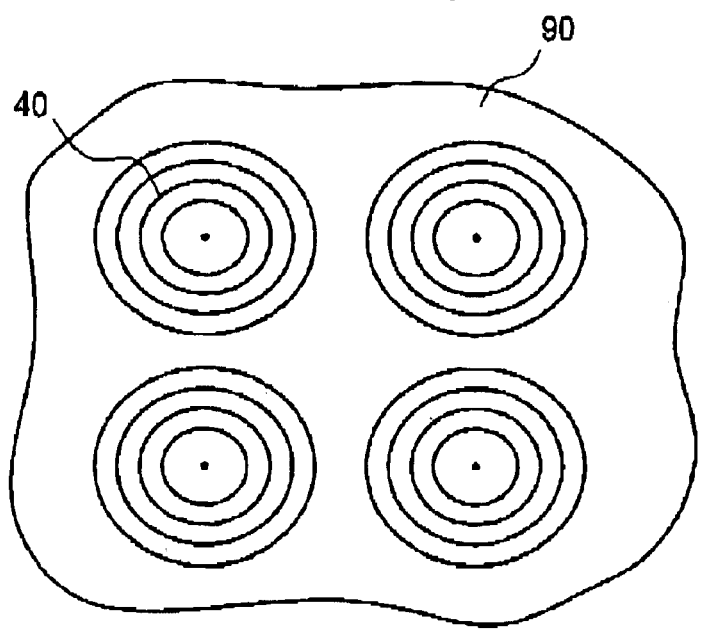
FIG. 14 is a plan view of the collection elements of FIG. 13, viewed in the direction of arrows 14—14.

The individual collection elements 40 making up the mechanical dust collector 10 do not have to be of the centrifugal type. For example, the mechanical dust collector may utilize louver-type elements 160, such as those of an elongated design (FIGS. 9 and 10); a pyramidal design (FIGS. 11 and 12); a conical design (FIGS. 13 and 14), etc. In all of these designs, while the entering flow of flue gas and solids particles makes a sharp turn to enter each individual collection element 40 and pass between the louvers 160, inertial forces cause the solids particles to continue their downward movement outside each collection element 40 toward the floor 90. The separated solids particles then slide along the floor 90 to the hopper 110, while cleaned flue gas exits from the collection elements 40 through an exit passage 170 as shown.

The design of a single individual collection element 40 is thus not limited by the overall separator arrangement and may be optimized to provide the required collection efficiency with the minimum pressure differential across the separator.

Figure 15:
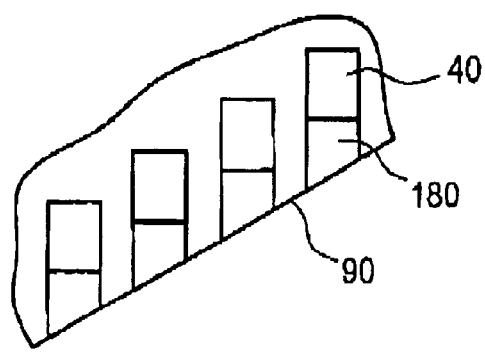
FIG. 15 is a sectional side view of one configuration of the mechanical dust collector according to the present invention.
Figure 16:
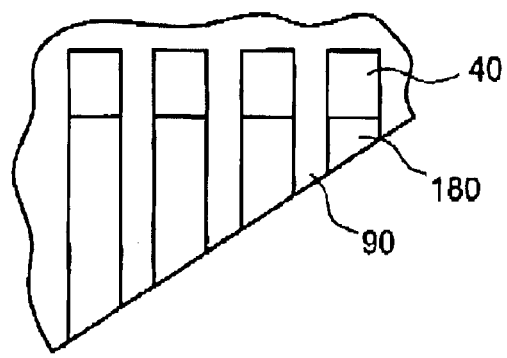
FIG. 16 is a sectional side view of yet another configuration of the mechanical dust collector according to the present invention.

The individual collection elements 40 can be mounted on the floor 90 and sloped toward the hopper 110 with the angle of the floor 90 relative to horizontal equal to or greater than the angle of repose for the collected solids particles to allow the removed solids particles to freely flow towards the hopper 110. Every collection element 40 can be mounted at its own elevation. If the height of a support 180 for each collection element 40 is the same, the elements 40 will form a slope similar to that of the floor 90 upon which they are supported, as illustrated in FIG. 15. Alternatively, using different supports 180 having different heights may allow placing all collection elements 40 at the same elevation, as illustrated in FIG. 16, or at any other desired arrangement.

Figure 17:
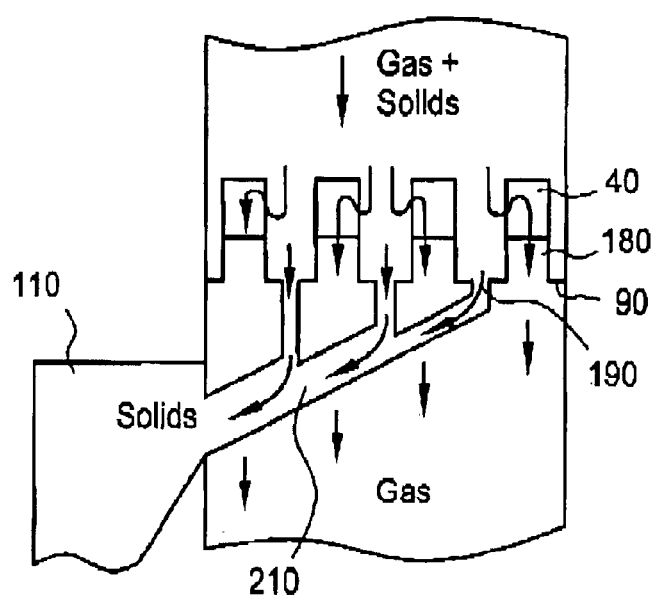
FIG. 17 is a sectional side view of yet another configuration of the mechanical dust collector according to the present invention.

The floor 90 may be provided without any slope, or with a slope insufficient to cause the collected solids particles to slide towards the hopper 110. In such situations, the floor 90 would be provided with a plurality of apertures 190 and discharge conduits 210 to convey the collected solids particles to the hopper 110, as illustrated in FIG. 17.

The mechanical dust collector according to the present invention has several advantages. Most importantly, the space occupied by the CFB unit is reduced, and in most cases it leads to the capital cost reduction. The invention also makes it easier to retrofit a CFB boiler and/or to increase the capacity of the CFB boiler being used to replace an existing (normally, pulverized coal type) boiler. Higher efficiency and design flexibility are obtainable with the multicyclone mechanical dust collector 10 since it comprises an array of smaller, individual collection elements 40 as compared to designs employing large cyclones.

While specific embodiments of the invention have been shown and described in detail to illustrate the application of the principles of the invention, it will be understood that changes may be made to the invention or it may be embodied otherwise without departing from such principles. For example, the present invention may be applied to new construction involving CFB boilers, or to the replacement, repair or modification of existing CFB boilers. In some embodiments of the present invention, certain features of the invention may be sometimes used to advantage without a corresponding use of other features. Accordingly, all such changes and embodiments properly fall within the scope of the following claims.

We claim:

1. A circulating fluidized bed (CFB) apparatus, comprising:
    a reaction chamber;
    a non-vertical flue having a floor, said flue connected to an outlet of the reaction chamber, and a vertical flue connected to an outlet of the non-vertical flue, for conveying a flow of flue gas and entrained solids particles from the reaction chamber across at least one heat exchange surface contained within the vertical flue; and
    a mechanical dust collector (MDC) having a hopper, said MDC including a plurality of individual collection elements for collecting the entrained solids particles from the flow of flue gas, each collection element having a downward bottom outlet opening for discharging a flow of cleaned flue gas, and wherein said MDC is located in the vertical flue above the at least one heat exchange surface and at least partially underneath the floor of the non-vertical flue.

2. The apparatus according to claim 1, wherein the floor of the non-vertical flue is utilized as a part of an enclosure of the vertical flue.

3. The apparatus according to claim 1, comprising a floor located within the MDC below the plurality of individual collection elements onto which the separated solids are discharged upon exiting from the individual collection elements.

4. The apparatus according to claim 3, wherein the floor located within the MDC is sloped to permit solids particles discharged thereon to slide towards the hopper.

5. The apparatus according to claim 3, wherein the individual collection elements are mounted on the floor located within the MDC.

6. The apparatus according to claim 5, wherein the individual collection elements are sloped such that they form a slope similar to that of the floor located within the MDC upon which they are mounted.

7. The apparatus according to claim 1, wherein each individual collection element comprises a plurality of angled spin vane means arranged within an annular upper portion of each of the elements, for separating the entrained solids particles from the flow of flue gas.

8. The apparatus according to claim 1, wherein each individual collection element comprises at least one tangential side gas inlet means for receiving the flow of flue gas and entrained solids particles to impart a swirling effect thereon for separating the entrained solids particles from the flow of flue gas.

9. The apparatus according to claim 1, wherein each individual collection element comprises louver type element means provided above each of the plurality of individual collection elements for separating the entrained solids particles from the flow of flue gas.

10. The apparatus according to claim 9, wherein the louver type elements consist of an elongated design, a pyramidal design, and a conical design.

11. The apparatus according to claim 3, wherein each individual collection element comprises at least one side exit opening provided at the bottom of each collection element for discharging the separated solids particles onto the floor located within the MDC separately from the flow of the flue gas.

12. The apparatus according to claim 3, wherein each individual collection element comprises an opening provided on each collection element for discharging the separated solids particles from around an entire periphery of the collection element onto the floor located within the MDC separately from the flow of flue gas.

13. The apparatus according to claim 1, wherein each individual collection element comprises a coaxial exit pipe connected to the bottom outlet opening for discharging flow of the cleaned gas.

14. The apparatus according to claim 1, comprising a floor located within the MDC below the plurality of individual collection elements onto which the separated solids particles are discharged upon exiting from the individual collection elements, and a plurality of apertures provided in the MDC floor below each collection element for separately conveying the flow of flue gas from the collection elements through the MDC floor.

15. The apparatus according to claim 1, comprising a floor located within the MDC below the plurality of individual collection elements onto which the separated solids are discharged upon exiting from the individual collection elements, and a plurality of apertures provided in the MDC floor between collection elements, said apertures communicating with the hopper via conduits, for conveying the separated solids particles to the hopper.

16. A mechanical dust collector (MDC), comprising a plurality of individual collection elements for separating entrained solids particles from a flow of flue gas, each individual collection element having swirling means located at the top of the element, a shell with a non-horizontal bottom defining the element, an essentially coaxial exit pipe extending from the bottom and a floor of the MDC through part of the element's height for downwardly discharging cleaned flue gas, and an opening at a lowermost part of the bottom for discharging collected solids.

17. The MDC according to claim 16, wherein the the bottom is slanted and the opening for discharging collected solids is through the shell at a lowermost part of the bottom and adjacent to the floor.

18. The MDC according to claim 16, wherein the bottom of the shell of the element has a conical shape and the opening for discharging collected solids is of an annular shape around the exit pipe.

19. A mechanical dust collector (MDC), comprising a plurality of individual collection elements for separating entrained solids particles from a flow of flue gas the MDC located in a single, straight, vertical flue above and upstream of at least one heat exchange surface, each individual collection element having louver type element means for separating the solids particles from the flow of flue gas and means for conveying the flow of flue gas from an upper portion of the collection element downwardly therethrough to a bottom outlet opening for discharging cleaned flue gas.

* * * * *